(12) United States Patent
Faulhaber et al.

(10) Patent No.: US 12,548,966 B2
(45) Date of Patent: Feb. 10, 2026

(54) MULTIPLE SIGNAL FIBER, OPTICAL PUMP-SIGNAL COMBINER

(71) Applicant: Lumentum Operations LLC, San Jose, CA (US)

(72) Inventors: Richard D. Faulhaber, San Carlos, CA (US); Patrick Gregg, Sunnyvale, CA (US); Jeff Gregg, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 255 days.

(21) Appl. No.: 18/499,062

(22) Filed: Oct. 31, 2023

(65) Prior Publication Data

US 2025/0020861 A1 Jan. 16, 2025

Related U.S. Application Data

(60) Provisional application No. 63/513,248, filed on Jul. 12, 2023.

(51) Int. Cl.
 H01S 3/094 (2006.01)
 G02B 6/02 (2006.01)
 (Continued)

(52) U.S. Cl.
 CPC .... H01S 3/094053 (2013.01); G02B 6/02042 (2013.01); G02B 6/04 (2013.01);
 (Continued)

(58) Field of Classification Search
 CPC .......... H01S 3/094053; H01S 3/06733; H01S 3/06737; H01S 3/06754; H01S 3/094003;
 (Continued)

(56) References Cited

U.S. PATENT DOCUMENTS

| 5,175,782 A | * | 12/1992 | Bowen | G02B 6/2856 385/51 |
| 7,492,993 B2 | * | 2/2009 | Nakai | G02B 6/2835 385/39 |

(Continued)

FOREIGN PATENT DOCUMENTS

| EP | 1210751 B1 | * | 8/2012 | ......... H01S 3/06708 |
| GB | 2439345 A | * | 12/2007 | ......... H01S 3/09415 |
| WO | WO-2007107163 A1 | * | 9/2007 | ........... G02B 6/2856 |

*Primary Examiner* — Michelle R Connelly
(74) *Attorney, Agent, or Firm* — Harrity & Harrity, LLP

(57) ABSTRACT

An optical pump-signal combiner includes a first end and a second end. The optical pump-signal combiner is tapered down from the first end to the second end. At a first cross-section of the optical pump-signal combiner associated with the first end, the optical pump-signal combiner includes a capillary, a plurality of signal fibers that are disposed within the capillary, and a plurality of pump fibers that surround the capillary. Each signal fiber, of the plurality of signal fibers, includes a signal core and a signal cladding, and each pump fiber, of the plurality of pump fibers, includes a pump core and a pump cladding. At a second cross-section of the optical pump-signal combiner associated with the second end, the optical pump-signal combiner includes a unified fiber that includes an outer combined-cladding, a combined-pump core, an inner combined-cladding, and a combined-signal core.

20 Claims, 5 Drawing Sheets

(51) Int. Cl.
  *G02B 6/04* (2006.01)
  *G02B 6/28* (2006.01)
  *H01S 3/067* (2006.01)
  *H01S 3/0941* (2006.01)
  *H01S 3/23* (2006.01)

(52) U.S. Cl.
  CPC ........ *G02B 6/2856* (2013.01); *H01S 3/06733* (2013.01); *H01S 3/06737* (2013.01); *H01S 3/06754* (2013.01); *H01S 3/094003* (2013.01); *H01S 3/094007* (2013.01); *H01S 3/094019* (2013.01); *H01S 3/09408* (2013.01); *H01S 3/09415* (2013.01); *H01S 3/2383* (2013.01)

(58) Field of Classification Search
  CPC ......... H01S 3/094007; H01S 3/094019; H01S 3/09408; H01S 3/09415; H01S 3/2383; G02B 6/02042; G02B 6/04; G02B 6/2856
  See application file for complete search history.

(56) References Cited

U.S. PATENT DOCUMENTS

| | | | |
|---|---|---|---|
| 11,619,788 B2* | 4/2023 | Muendel | G02B 6/2826 |
| | | | 385/115 |
| 12,298,555 B2* | 5/2025 | Gregg | H01S 3/094042 |
| 2009/0202204 A1* | 8/2009 | Nielsen | G02B 6/2551 |
| | | | 264/1.25 |
| 2011/0123155 A1* | 5/2011 | Kumkar | G02B 6/2856 |
| | | | 29/428 |
| 2022/0334327 A1* | 10/2022 | Muendel | G02B 6/4203 |
| 2023/0333315 A1* | 10/2023 | Gregg | H01S 3/094003 |
| 2023/0358963 A1* | 11/2023 | Zhu | C03C 13/04 |
| 2025/0155641 A1* | 5/2025 | Faulhaber | G02B 6/245 |

* cited by examiner

MULTIPLE SIGNAL FIBER, OPTICAL PUMP-SIGNAL COMBINER

CROSS-REFERENCE TO RELATED APPLICATION

This Patent Application claims priority to U.S. Provisional Patent Application No. 63/513,248, filed on Jul. 12, 2023, and entitled "MULTI-SIGNAL, SIGNAL PUMP COMBINER." The disclosure of the prior Application is considered part of and is incorporated by reference into this Patent Application.

TECHNICAL FIELD

The present disclosure relates generally to an optical pump-signal combiner and to an optical pump-signal combiner that includes multiple signal fibers.

BACKGROUND

Pump-signal combiners are critical components of high-power fiber lasers. A pump-signal combiner combines pump light and signal light to increase a power of the signal light.

SUMMARY

In some implementations, an optical pump-signal combiner includes a first end; and a second end, wherein: the optical pump-signal combiner is tapered down from the first end to the second end, at a first cross-section of the optical pump-signal combiner associated with the first end, the optical pump-signal combiner includes: a capillary; a plurality of signal fibers that are disposed within the capillary, wherein each signal fiber, of the plurality of signal fibers, includes a signal core and a signal cladding, and a plurality of pump fibers that surround the capillary, and wherein each pump fiber, of the plurality of pump fibers, includes a pump core and a pump cladding, and at a second cross-section of the optical pump-signal combiner associated with the second end, the optical pump-signal combiner includes a unified fiber that includes an outer combined-cladding, a combined-pump core, an inner combined-cladding, and a combined-signal core.

In some implementations, an optical pump-signal combiner includes a first end; and a second end, wherein: at a first cross-section of the optical pump-signal combiner associated with the first end, the optical pump-signal combiner includes: a capillary; a plurality of signal fibers that are disposed within the capillary, and a plurality of pump fibers that surround the capillary, and at a second cross-section of the optical pump-signal combiner associated with the second end, the optical pump-signal combiner includes a unified fiber that includes an outer combined-cladding, a combined-pump core, an inner combined-cladding, and a combined-signal core.

In some implementations, an optical pump-signal combiner includes a capillary; a plurality of signal fibers, and a plurality of pump fibers; and a unified fiber, wherein: at a first cross-section of the optical pump-signal combiner associated with a first end of the optical pump-signal combiner: the plurality of signal fibers are disposed within the capillary, and the plurality of pump fibers surround the capillary, and at a second cross-section of the optical pump-signal combiner associated with a second end of the optical pump-signal combiner, the unified fiber includes: a combined-signal core, an inner combined-cladding that surrounds the combined-signal core, a combined-pump core that surrounds the inner combined-cladding, and an outer combined-cladding that surrounds the combined-pump core.

DETAILED DESCRIPTION

Figure 1A:
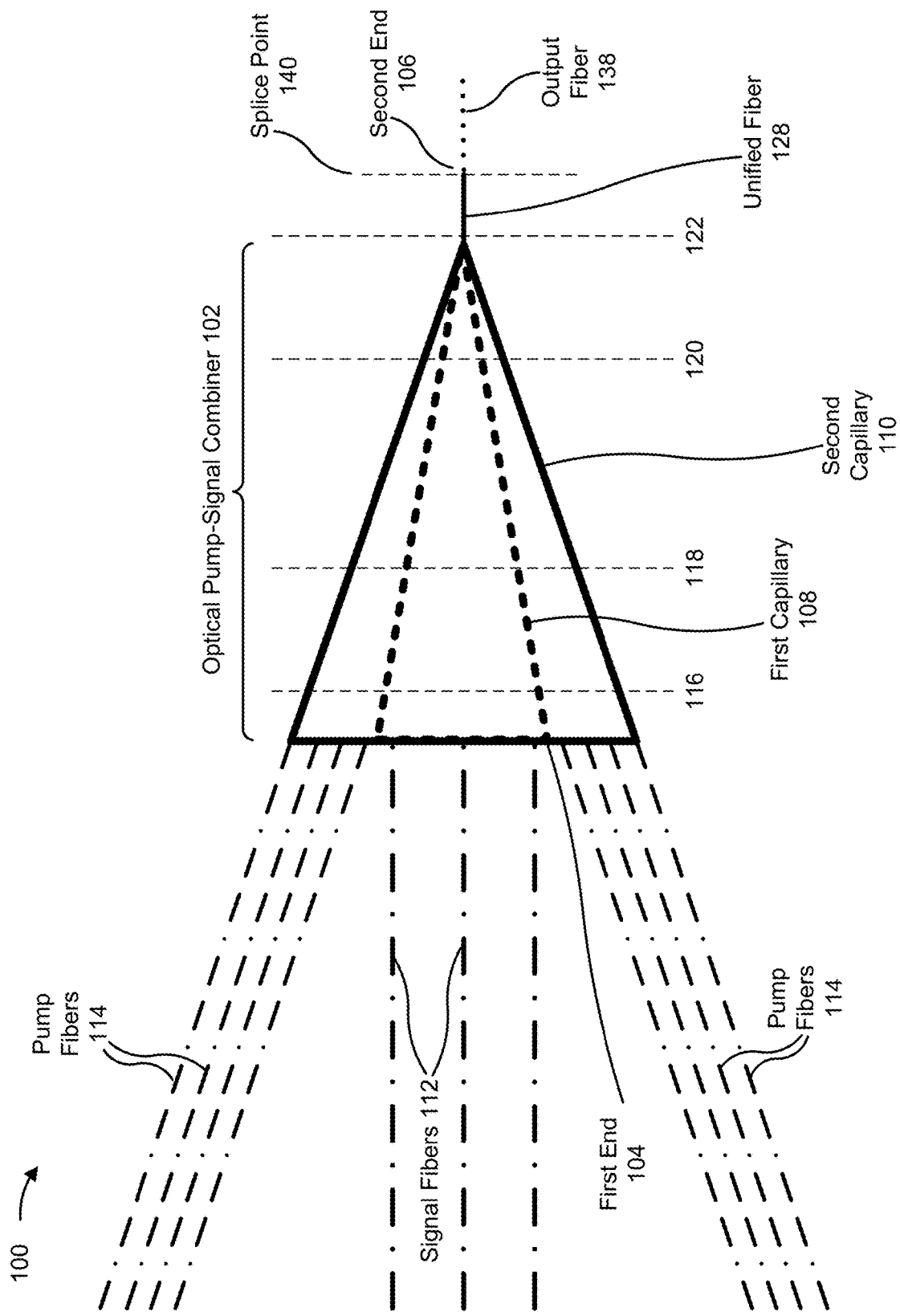
FIGS. 1A-1E are diagrams of an example implementation described herein.

The following detailed description of example implementations refers to the accompanying drawings. The same reference numbers in different drawings may identify the same or similar elements.

A pump combiner is a device that can be used to combine multiple pump beams (e.g., optical pump beams) into an optical fiber in which a signal beam (e.g., optical signal) is propagating. The pump beams can be used to amplify the signal beam (e.g., increase an optical power of the signal beam) as it propagates within the optical fiber. In many cases, a pump combiner is arranged in a bundle, where pump fibers (e.g., that provide pump beams) and a single signal fiber (e.g., that provides a signal beam) are arranged into a particular close-packed configuration (e.g., a hexagonal close-packed configuration, or the like), and the bundle is fused and tapered to a target size.

However, when multiple signal beams are needed to be combined (e.g., to provide even greater optical power and/or higher brightness), such an approach becomes impractical. For example, when multiple signal fibers provide multiple signal beams, using individual pump combiners (that each include multiple pump fibers) for each signal fiber requires a substantial physical footprint; increases an amount of optical fiber that needs to be used, which increases a likelihood of nonlinear effects (e.g., stimulated Raman scattering (SRS) and/or other nonlinear effects); and increases an overall complexity. Further, output fibers of the pump combiners need to be spliced together to allow the signal beams to combine and be provided to a target fiber, which can result in signal loss, reduced brightness, and/or other issues associated with the signal beams.

Some implementations described herein include an optical pump-signal combiner that includes a first end and a second end. At a first cross-section of the optical pump-signal combiner associated with the first end, the optical pump-signal combiner includes a capillary, a plurality of signal fibers that are disposed within the capillary, and a plurality of pump fibers that surround the capillary. Each signal fiber, of the plurality of signal fibers, includes a signal core and a signal cladding, and each pump fiber, of the plurality of pump fibers, includes a pump core and a pump cladding. The capillary is configured to confine pump light, from pump beams that propagate via the plurality of pump fibers, outward from an outer diameter of the capillary, and to confine signal light, from signal beams that propagate via the plurality of signal fibers, inward from an inner diameter of the capillary.

The optical pump-signal combiner is tapered from the first end to the second end (e.g., tapered-down). That is, a cross-sectional size of the optical pump-signal combiner (e.g., a width, a diameter, or another measurement of size of the optical pump-signal combiner) at the first end is greater than a cross-sectional size of the optical pump-signal combiner at the second end. The optical pump-signal combiner may be tapered as a result of a formation process to form the optical pump-signal combiner. As part of the formation process, and to cause the optical pump-signal combiner to be tapered, the formation process causes the first capillary, the plurality of signal fibers, and the plurality of pump fibers to be combined into a unified fiber. Accordingly, at a second cross-section of the optical pump-signal combiner associated with the second end, the optical pump-signal combiner includes the unified fiber.

The unified fiber includes an outer combined-cladding, a combined-pump core, an inner combined-cladding, and a combined-signal core. The outer combined-cladding is formed from portions of pump claddings of the plurality of pump fibers; the combined-pump core is formed from pump cores of the plurality of pump fibers; the inner combined-cladding is formed from at least one of other portions of the pump claddings of the plurality of pump fibers, the capillary, or portions of signal claddings of the plurality of signal fibers; and the combined-signal core is formed from signal cores of the plurality of signal fibers.

Accordingly, the outer combined-cladding is configured to confine pump light, from pump beams that propagate via the plurality of pump fibers, to the combined-pump core; the combined-pump core is configured to propagate the pump light; the inner combined-cladding is configured to confine the pump light to the combined-pump core and to confine signal light, from signal beams that propagate via the plurality of signal fibers, to the combined-signal core; and the combined-signal core is configured to propagate the signal light. This results in the pump light and the signal light separately propagating through different portions of the optical pump-signal combiner, such as to an output fiber.

In this way, the optical pump-signal combiner minimizes, or prevents, unwanted interactions between the pump light and the signal light while propagating through the optical pump-signal combiner. For example, this can decrease a likelihood of nonlinear effects, signal loss, and/or reduced brightness. Further, because multiple signal fibers can be included in a single optical pump-signal combiner, additional combiners are not needed, which decreases a size of a physical footprint, and an overall complexity, that is needed to provide multiple amplified signal beams to an output fiber. Further, a single optical pump-signal combiner reduces a need for splicing multiple signal fibers together, which further reduces a likelihood of nonlinear effects, signal loss, and/or reduced brightness.

FIGS. 1A-1E are diagrams of an example implementation 100 described herein. As shown in FIGS. 1A-1E, the example implementation 100 may include an optical pump-signal combiner 102, which has a first end 104 (e.g., an input end) and a second end 106 (e.g., an output end). FIG. 1A shows a top-down view of the optical pump-signal combiner 102, and FIGS. 1B-1E show cross-sectional views of the optical pump-signal combiner 102 at various points from the first end 104 to the second end 106 of the optical pump-signal combiner 102.

As shown in FIGS. 1A-1E, the optical pump-signal combiner 102 may include a first capillary 108 (e.g., an inner capillary) and, in some implementations, a second capillary 110 (e.g., an outer capillary). As further shown in FIGS. 1A-1E, example implementation 100 may include a plurality of signal fibers 112 and a plurality of pump fibers 114. As further described herein, respective portions of the plurality of signal fibers 112 and the plurality of pump fibers 114 may be inserted into the optical pump-signal combiner 102 (e.g., via the first end 104 of the optical pump-signal combiner 102), and therefore the optical pump-signal combiner 102 may include the plurality of signal fibers 112 and the plurality of pump fibers 114.

Figure 1B:
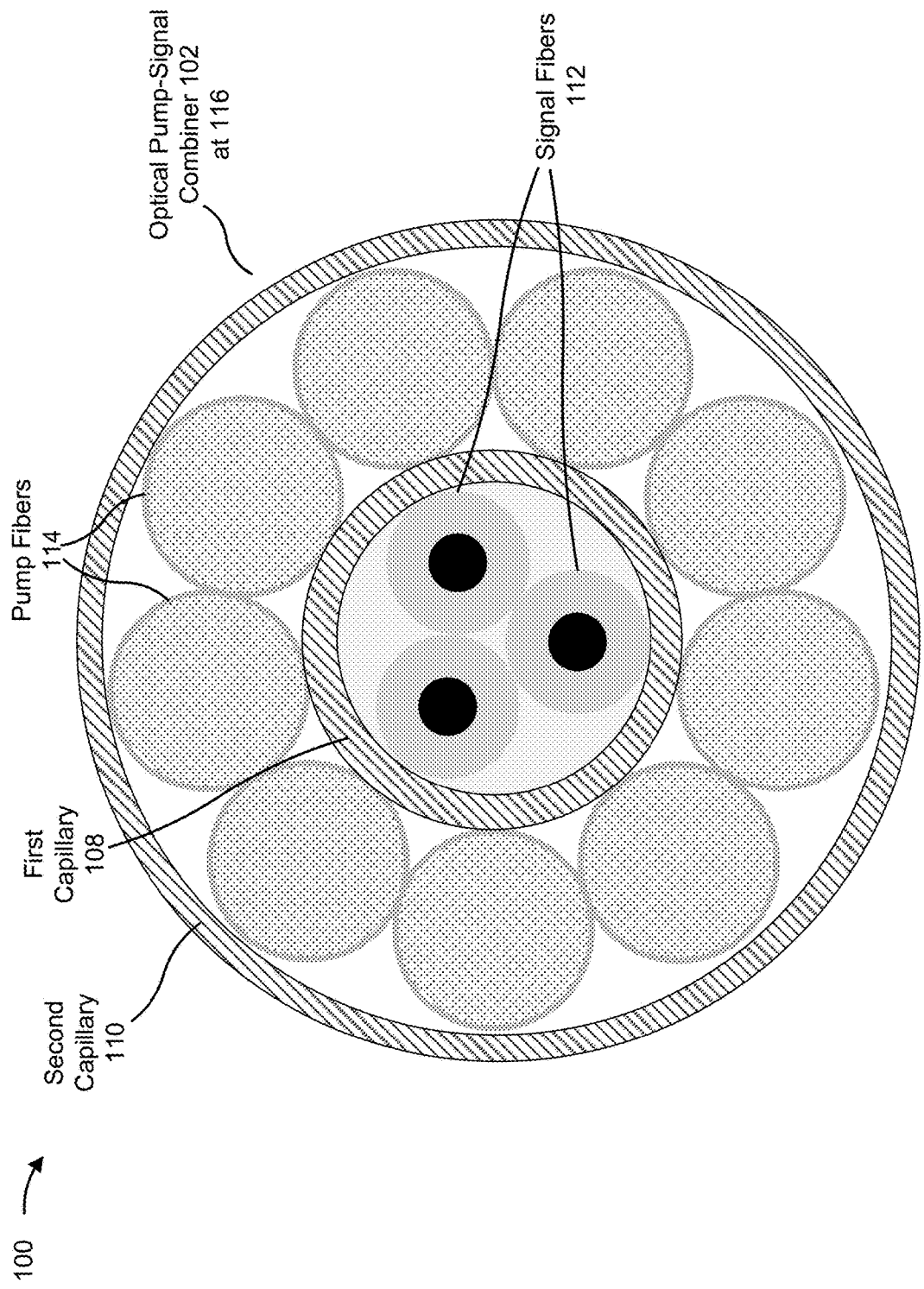

Each capillary of the first capillary 108 and the second capillary 110 may be a hollow, open-ended tube, such as a capillary tube (e.g., a glass capillary tube). Accordingly, an internal portion of each capillary (e.g., the first capillary 108 and the second capillary 110) may be defined by a space within the capillary, such as a space between internal surfaces of one or more walls of the capillary. In some implementations, the plurality of signal fibers 112 (e.g., at the first end 104 of the optical pump-signal combiner 102) may be disposed within the first capillary 108, such as within the internal portion of the first capillary 108 (e.g., the plurality of signal fibers 112 may be inserted into and may fill the internal portion of the first capillary 108). Additionally, or alternatively, the plurality of pump fibers 114, the first capillary 108, and the plurality of signal fibers 112 may be disposed within the second capillary 110, such as within the internal portion of the second capillary 110. For example, as shown in FIG. 1B, the plurality of pump fibers 114, the first capillary 108, and the plurality of signal fibers 112 may be inserted into and may fill the internal portion of the first capillary 108 such that the plurality of signal fibers 112 are disposed within the first capillary 108 and the plurality of pump fibers 114 surround (e.g., circumferentially surround) the first capillary 108.

Each signal fiber 112, of the plurality of signal fibers 112 may include a signal cladding and/or a signal core. For example, as shown in FIG. 1B, a signal fiber 112 may include a signal core (e.g., indicated by black shading) that is circumferentially surrounded by a signal cladding (e.g., indicated by light gray shading). In some implementations, each signal fiber 112 may not include a signal cladding (e.g., the signal fiber 112 may comprise only a signal core). Each signal fiber 112 may be configured to propagate a signal beam (e.g., to the optical pump-signal combiner 102, such as to the first end 104 of the optical pump-signal combiner 102). For example, the signal core of the signal fiber 112 may be configured to propagate the signal beam (e.g., within the signal core) and the signal cladding of the signal fiber 112 may be configured to confine the signal beam within the signal core. The signal beam may be provided by a signal light source (e.g., a laser light source, not shown) and may propagate to the optical pump-signal combiner 102 via the signal fiber 112.

Each pump fiber 114, of the plurality of pump fibers 114, may include a pump cladding and/or a pump core. For example, as shown in FIG. 1B, a pump fiber 114 may include a pump core (e.g., indicated by gray dot patterning) that is circumferentially surrounded by a pump cladding (e.g., indicated by solid gray shading). In some implementations, each pump fiber 114 may not include a pump cladding (e.g., the pump fiber 114 may comprise only a pump core). Each pump fiber 114 may be configured to propagate a pump beam (e.g., to the optical pump-signal combiner 102, such as to the first end 104 of the optical pump-signal combiner 102). For example, the pump core of the pump fiber 114 may be configured to propagate the pump beam (e.g., within the pump core), and the pump cladding of the pump fiber 114 may be configured to confine the pump beam within the pump core. The pump beam may be provided by a pump light source (e.g., a laser light source, or another type of light source, not shown) and may propagate to the optical pump-signal combiner 102 via the pump fiber 114.

While some implementations described herein include the plurality of signal fibers 112 and the plurality of pump fibers 114, implementations are not limited to only "signal" and "pump" fibers. That is, any signal fiber 112 or pump fiber 114 may be configured to propagate a beam (whether it be a signal beam, a pump beam, or another type of beam). Accordingly, the plurality of signal fibers 112 may also be referred to as a plurality of inner fibers (e.g., because they are disposed within the first capillary 108), and the plurality of pump fibers 114 may be referred to as a plurality of outer fibers (e.g., because they surround the first capillary 108).

In some implementations, the first capillary 108, the second capillary 110, the plurality of signal fibers 112, and/or the plurality of pump fibers 114 may each comprise glass (e.g., a silica-based glass, a quartz-based glass, a fluorinated glass, or another type of glass). In some implementations, the first capillary 108, the second capillary 110, the plurality of signal fibers 112, and/or the plurality of pump fibers 114 may comprise a same type of glass. In some implementations, the first capillary 108 may have one or more optical properties (e.g., refractive index, light confinement, or another optical property) that is different than that of the second capillary 110 (e.g., because the first capillary 108 and the second capillary have different amounts of a dopants, such as fluorine).

In some implementations, each capillary of the first capillary 108 and/or the second capillary 110 may include one or more capillary layers that each comprise a different type of glass. For example, a capillary may include a first capillary layer that includes an undoped silica-based glass and a second capillary layer that includes doped silica-based glass (e.g., doped with germanium, fluorine, or another dopant). In this way, internal surfaces of one or more walls of the capillary (e.g., that define an internal portion of the capillary) may be defined by the first capillary layer, and external surfaces of one or more walls of the capillary (e.g., that define an external environment outside of the capillary) may be defined by the second capillary layer, or vice versa.

In some implementations, a signal core and a signal cladding of each signal fiber 112, of the plurality of signal fibers 112, may each comprise a different type of glass. For example, the signal core may comprise a doped silica-based glass and the signal cladding may comprise an undoped silica-based glass, or vice versa. Accordingly, each signal fiber 112 may have a numerical aperture (NA) that ranges from 0.6 to 0.15 (e.g., is greater than or equal to 0.6 and less than or equal to 0.15).

In some implementations, a pump core and a pump cladding of each pump fiber 114, of the plurality of pump fibers 114, may each comprise a different type of glass. For example, the pump core may comprise a doped silica-based glass (e.g., doped with germanium, fluorine, or another dopant) and the pump cladding may comprise an undoped silica-based glass, or vice versa. Accordingly, each pump fiber 114 may have an NA that ranges from 0.22 to 0.28 (e.g., is greater than or equal to 0.22 and less than or equal to 0.28).

As further shown in FIG. 1A, the optical pump-signal combiner 102 may be tapered from the first end 104 to the second end 106 (e.g., tapered-down). That is, a cross-sectional size of the optical pump-signal combiner 102 (e.g., a width, a diameter, or another measurement of size of the optical pump-signal combiner 102) at the first end 104 may be greater than a cross-sectional size of the optical pump-signal combiner 102 at the second end 106. The optical pump-signal combiner 102 may be tapered as a result of a formation process to form the optical pump-signal combiner 102.

As part of the formation process, and to cause the optical pump-signal combiner 102 to be tapered, the formation process may include applying heat and/or applying a force (e.g., a tensile force) to one or more portions of the optical pump-signal combiner 102, including to the first capillary 108, the second capillary 110, the plurality of signal fibers 112, and/or the plurality of pump fibers 114. At the first end 104 of the optical pump-signal combiner 102, the formation process may allow the first capillary 108 and the second capillary 110 to be individual capillaries and the plurality of signals fiber 112 and the plurality of pump fibers 114 be individual fibers, and, at the second end 106 of the optical pump-signal combiner 102, the formation process may allow the first capillary 108, the second capillary 110, the plurality of signals fiber 112, and the plurality of pump fibers 114 to be combined into a unified fiber (e.g., a unified fiber 128, as further described herein in relation to FIGS. 1B-1E).

FIGS. 1B-1E show cross-sectional views of the optical pump-signal combiner 102 at cross-sections 116, 118, 120, and 122 shown in FIG. 1A. The cross-section 116 may be associated with the first end 104 of the optical pump-signal combiner 102, the cross-section 118 may be associated with a portion of the optical pump-signal combiner 102 that is closer to the first end 104 than the second end 106 of the optical pump-signal combiner 102, the cross-section 120 may be associated with a portion of the optical pump-signal combiner 102 that is closer to the second end 106 than the first end 104 of the optical pump-signal combiner 102, and the cross-section 122 may be associated with the second end 106 of the optical pump-signal combiner 102.

As shown in FIG. 1B, at the cross-section 116, the plurality of signal fibers 112 and the plurality of pump fibers 114 may be individual fibers. Accordingly, the plurality of signal fibers 112 may be distinct from each other (e.g., not connected), and thereby a signal beam that propagates via a signal fiber 112 is prevented from coupling to another signal fiber 112. Moreover, the plurality of pump fibers 114 may be distinct from each other, and thereby a pump beam that propagates via a pump fiber 114 is prevented from coupling to another pump fiber 114.

As further shown in FIG. 1B, at the cross-section 116, the first capillary 108 and the second capillary 110 may be individual capillaries. Further, the plurality of signal fibers 112 may be disposed within the first capillary 108 (e.g., within an internal portion of the first capillary 108), and the first capillary 108 (and the plurality of signal fibers 112 disposed within the first capillary 108) may be disposed within the second capillary 110 (e.g., within an internal portion of the second capillary 110). The plurality of pump fibers 114 may be disposed within the second capillary 110 (e.g., within the internal portion of the second capillary 110), and, notably, may be disposed external to the first capillary 108 (e.g., not within the internal portion of the first capillary 108). For example, as shown in FIG. 1B, the plurality of pump fibers 114 may surround the first capillary 108 (and therefore may surround the plurality of signal fibers 112).

Accordingly, the plurality of signal fibers 112 may be disposed in an inner area of the optical pump-signal combiner 102 (e.g., of a cross-section of the optical pump-signal combiner 102 at the cross-section 116) and the plurality of pump fibers 114 may be disposed in an outer area of the optical pump-signal combiner 102 (e.g., of the cross-section of the optical pump-signal combiner 102 at the cross-section 116), where the inner area and the outer area are separated by the first capillary 108 (e.g., the one or more walls of the first capillary 108). In this way, the outer area may surround (e.g., circumferentially surround) the inner area.

In some implementations, the first capillary 108, at the cross-section 116, may have a thickness (e.g., the one or more walls of the first capillary 108 may have a thickness) to confine pump light (e.g., from pump beams that propagate via the plurality of pump fibers 114) to the outer area (e.g., outward from an outer diameter of the first capillary 108), and to confine signal light (e.g., from signal beams that propagate via the plurality of signal fibers 112) to the inner area (e.g., inward from an inner diameter of the first capillary 108). In this way, at the cross-section 118, the first capillary 108 may be configured to prevent propagation of the pump light from the outer area to the inner area, and to prevent propagation of the signal light from the inner area to the outer area.

Figure 1C:
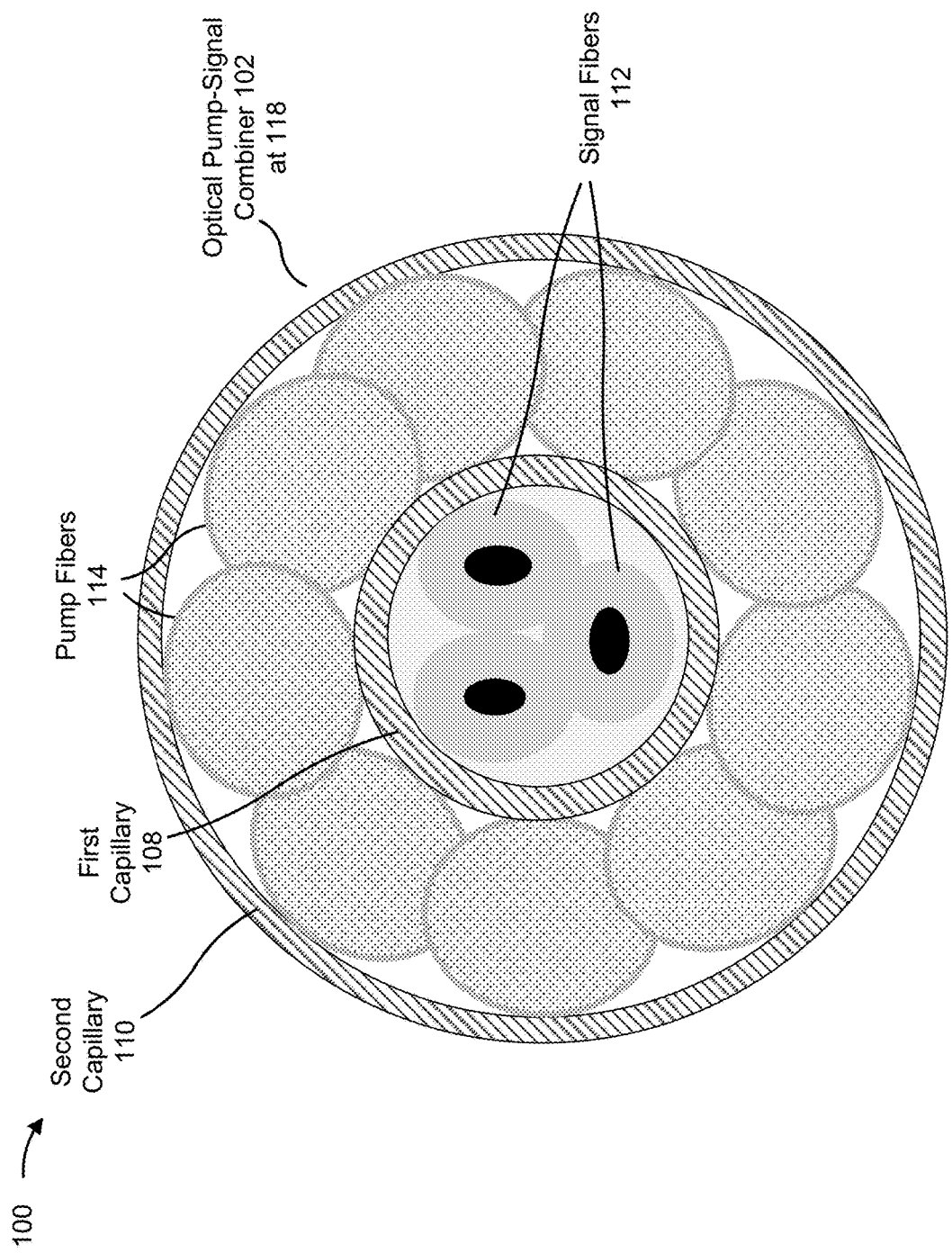

As shown in FIG. 1C, at the cross-section 118, the plurality of signal fibers 112 may be disposed within the first capillary 108, and the first capillary 108 (and the plurality of signal fibers 112 disposed within the first capillary 108) may be disposed within the second capillary 110, in a similar manner as that described above in relation to FIG. 1B. Notably, at least a portion of the plurality of signal fibers 112 may be connected to each other (e.g., within the first capillary 108). For example, as shown in FIG. 1C, a signal cladding of a signal fiber 112, of the plurality of signal fibers 112, may be connected to a signal cladding of at least one other signal fiber 112 of the plurality of signal fibers 112. This may be a result of the formation process described above. In some implementations, a portion of the plurality of signal fibers 112 may be configured (e.g., because at least a portion of the plurality of signal fibers 112 may be connected to each other) to allow signal beam coupling between the signal cores of at least a portion of the plurality of signal fibers 112.

As further shown in FIG. 1C, at the cross-section 118, the plurality of pump fibers 114 may be disposed within the second capillary 110 (e.g., within the internal portion of the second capillary 110), and may be disposed external to the first capillary 108 (e.g., not within the internal portion of the first capillary 108), in a similar manner as that described above in relation to FIG. 1B. For example, as shown in FIG. 1C, the plurality of pump fibers 114 may surround the first capillary 108 (and therefore may surround the plurality of signal fibers 112). Notably, at least a portion of the plurality of pump fibers 114 may be connected to each other. For example, as shown in FIG. 1C, a pump cladding of a pump fiber 114, of the plurality of pump fibers 114, may be connected to a pump cladding of at least one other pump fiber 114 of the plurality of pump fibers 114. This may be a result of the formation process described above. In some implementations, a portion of the plurality of pump fibers 114 may be configured (e.g., because at least a portion of the plurality of pump fibers 114 may be connected to each other) to allow pump beam coupling between the pump cores of at least a portion of the plurality of pump fibers 114.

Accordingly, in a similar manner as that described above in relation to FIG. 1B, the plurality of signal fibers 112 may be disposed in an inner area of the optical pump-signal combiner 102 (e.g., of a cross-section of the optical pump-signal combiner 102 at the cross-section 118) and the plurality of pump fibers 114 may be disposed in an outer area of the optical pump-signal combiner 102 (e.g., of the cross-section of the optical pump-signal combiner 102 at the cross-section 118), where the inner area and the outer area are separated by the first capillary 108 (e.g., the one or more walls of the first capillary 108). Additionally, the first capillary 108, at the cross-section 118, may have a thickness (e.g., the one or more walls of the first capillary 108 may have a thickness) to confine pump light (e.g., from pump beams that propagate via the plurality of pump fibers 114) to the outer area (e.g., outward from an outer diameter of the first capillary 108), and to confine signal light (e.g., from signal beams that propagate via the plurality of signal fibers 112) to the inner area (e.g., inward from an inner diameter of the first capillary 108). In this way, at the cross-section 118, the first capillary 108 may be configured to prevent propagation of the pump light from the outer area to the inner area, and to prevent propagation of the signal light from the inner area to the outer area.

In some implementations, because of the formation process, the optical pump-signal combiner 102 may be tapered from the cross-section 116 to the cross-section 118. Accordingly, a cross-sectional size of the optical pump-signal combiner 102 at the cross-section 116 may be greater than a cross-sectional size of the optical pump-signal combiner 102 at the cross-section 118. Accordingly respective sizes (e.g., widths, diameters, thicknesses, or other measurements of size) of the first capillary 108, the second capillary 110, the plurality of signal fibers 112, and/or the plurality of pump fibers 114 at the cross-section 116 may be greater than respective sizes of the first capillary 108, the second capillary 110, the plurality of signal fibers 112, and/or the plurality of pump fibers 114 at the cross-section 118. That is, one or more of the first capillary 108, the second capillary 110, the plurality of signal fibers 112, and/or the plurality of pump fibers 114 may be tapered. Further, the optical pump-signal combiner 102 may be tapered down from the cross-section 116 to the cross-section 118 according to a first taper ratio, and at least one of the first capillary 108, the second capillary 110, the plurality of signal fibers 112, or the plurality of pump fibers 114 may tapered down from the cross-section 116 to the cross-section 118 according to a second taper ratio. In some implementations, the second ratio may match the first taper ratio (e.g., be equal to, within a tolerance, such as a 1%, 2%, or 3% tolerance).

Figure 1D:
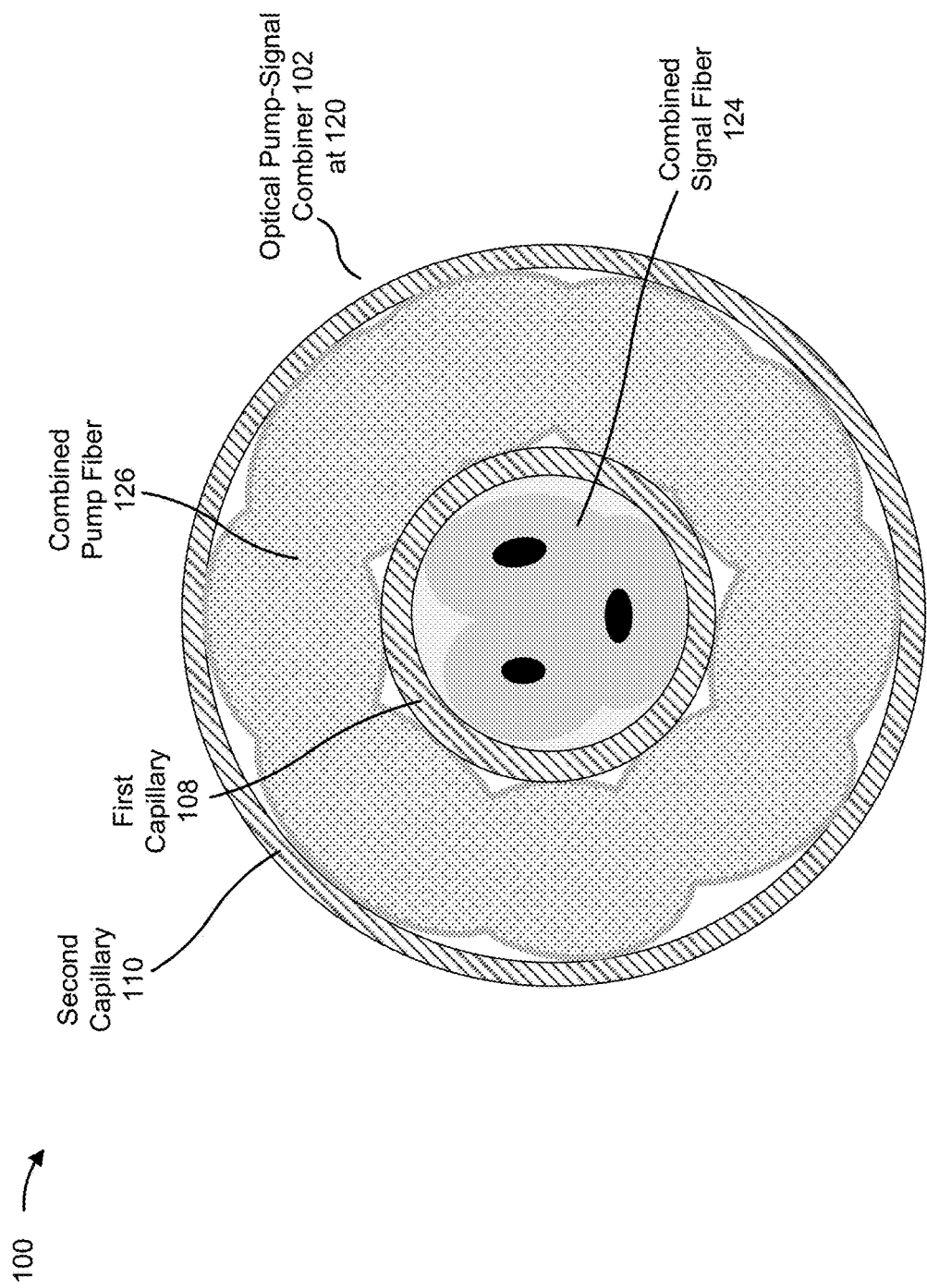

As shown in FIG. 1D, at the cross-section 120, the plurality of signal fibers 112 may be combined to form a combined signal fiber 124 (e.g., instead of individual or connected fibers), which may also be referred to as a combined inner fiber. This may be a result of the formation process described above. For example, the plurality of signal fibers 112 may be combined such that the signal claddings of the plurality of signal fibers 112 form a single signal cladding (e.g., with minimal space and/or gaps formed within the single signal cladding). As shown in FIG. 1D, the signal cores of the plurality of signal fibers 112 may not be combined within the combined signal fiber 124 (e.g., as a result of the formation process). Accordingly, the combined signal fiber 124 may be referred to as a multi-core signal fiber that includes a plurality of signal cores. In some implementations, the combined signal fiber 124 may be configured to allow signal beam coupling between the signal cores of the combined signal fiber 124. As further shown in FIG. 1D, the combined signal fiber 124 may be disposed within the first capillary 108, and the first capillary 108 (and the combined signal fiber 124 disposed within the first capillary 108) may be disposed within the second capillary 110.

As further shown in FIG. 1D, at the cross-section 120, the plurality of pump fibers 114 may be combined to each other to form a combined pump fiber 126 (e.g., instead of individual or connected fibers), which may also be referred to as a combined outer fiber. This may be a result of the formation process described above. For example, the plurality of pump fibers 114 may be combined such that the pump cores of the plurality of pump fibers 114 form a single pump core (e.g., with minimal space and/or gaps formed within the single pump core), and first portions of the pump claddings of the plurality of pump fibers 114 form a single interior pump cladding (e.g., adjacent to the first capillary 108) and second portions of the pump claddings of the plurality of pump fibers 114 form a single exterior pump cladding (e.g., adjacent to the second capillary 110). In some implementations, the combined pump fiber 126 may be configured to allow multiple pump beams to propagate via the single pump core of the combined pump fiber 126.

As further shown in FIG. 1D, the combined pump fiber 126 may be disposed within the second capillary 110 (e.g., within the internal portion of the second capillary 110), and may be disposed external to the first capillary 108 (e.g., not within the internal portion of the first capillary 108). For example, as shown in FIG. 1D, the combined pump fiber 126 may surround the first capillary 108 (and therefore may surround the combined signal fiber 124). In some implementations, the single pump core may form a ring shape in cross-section surrounding the single interior pump cladding and the combined signal fiber.

Accordingly, in a similar manner as that described above, the combined signal fiber 124 may be disposed in an inner area of the optical pump-signal combiner 102 (e.g., of a cross-section of the optical pump-signal combiner 102 at the cross-section 120) and the combined pump fiber 126 may be disposed in an outer area of the optical pump-signal combiner 102 (e.g., of the cross-section of the optical pump-signal combiner 102 at the cross-section 120), where the inner area and the outer area are separated by the first capillary 108 (e.g., the one or more walls of the first capillary 108). Additionally, the first capillary 108, at the cross-section 120, may have a thickness (e.g., the one or more walls of the first capillary 108 may have a thickness) to confine pump light (e.g., from pump beams that propagate via the combined pump fiber 126) to the outer area (e.g., outward from an outer diameter of the first capillary 108), and to confine signal light (e.g., from signal beams that propagate via the combined signal fiber 124) to the inner area (e.g., inward from an inner diameter of the first capillary 108). In this way, at the cross-section 118, the first capillary 108 may be configured to prevent propagation of the pump light from the outer area to the inner area, and to prevent propagation of the signal light from the inner area to the outer area.

In some implementations, because of the formation process, the optical pump-signal combiner 102 may be tapered from the cross-section 118 to the cross-section 120 (and/or the cross-section 116 to the cross-section 120). Accordingly, a cross-sectional size of the optical pump-signal combiner 102 at the cross-section 118 (and/or at the cross-section 116) may be greater than a cross-sectional size of the optical pump-signal combiner 102 at the cross-section 120. Accordingly, respective sizes (e.g., widths, diameters, thicknesses, or other measurements of size) of the first capillary 108, the second capillary 110, the plurality of signal fibers 112, and/or the plurality of pump fibers 114 at the cross-section 118 (and/or at the cross-section 116) may be greater than respective sizes of the first capillary 108, the second capillary 110, the combined signal fiber 124, and/or the combined pump fiber 126 at the cross-section 120. That is, one or more of the first capillary 108, the second capillary 110, the plurality of signal fibers 112 and/or the combined signal fiber 124, and/or the plurality of pump fibers 114 and/or the combined pump fiber 126 may be tapered. Further, the optical pump-signal combiner 102 may be tapered down from the cross-section 118 (and/or the cross-section 116) to the cross-section 120 according to a first taper ratio, and at least one of the first capillary 108, the second capillary 110, the plurality of signal fibers 112, or the plurality of pump fibers 114 may be tapered down from the cross-section 118 (and/or the cross-section 116) to the cross-section 120 according to a second taper ratio. In some implementations, the second taper ratio may match the first taper ratio (e.g., be equal to, within a tolerance, such as a 1%, 2%, or 3% tolerance).

Figure 1E:
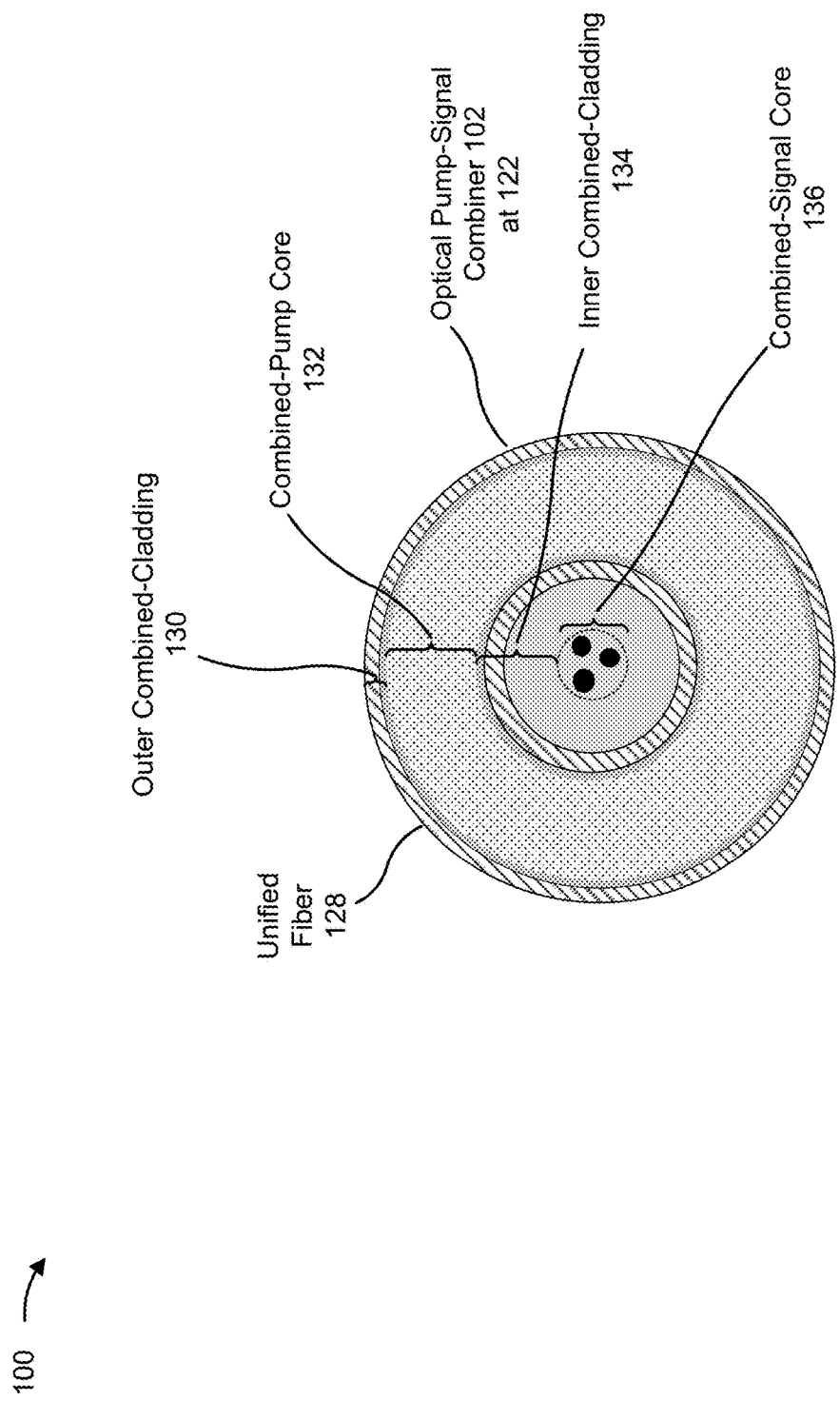

As shown in FIG. 1E, at the cross-section 122, the first capillary 108, the second capillary 110, the combined signal fiber 124 (e.g., formed from the plurality of signal fibers 112), and/or the combined pump fiber 126 (e.g., formed from the plurality of pump fibers 114) may be combined to form a unified fiber 128. This may be a result of the formation process described above. As shown in FIG. 1E, the unified fiber 128 may include an outer combined-cladding 130, a combined-pump core 132 (also referred to as a combined-outer core), an inner combined-cladding 134, and/or a combined-signal core 136 (also referred to as a combined-inner core).

The outer combined-cladding 130 may comprise the single exterior pump cladding of the combined pump fiber 126 (e.g., that is formed from the second portions of the pump claddings of the plurality of pump fibers 114) and/or the second capillary 110. The combined-pump core 132 may comprise the single pump core of the combined pump fiber 126 (e.g., that is formed from the pump cores of the plurality of pump fibers 114). The inner combined-cladding 134 may comprise the single interior pump cladding of the combined pump fiber 126 (e.g., that is formed from the first portions of the pump claddings of the plurality of pump fibers 114), the first capillary 108, and/or one or more portions of the single signal cladding of the combined signal fiber 124 (e.g., that is formed from the signal claddings of the plurality of signal fibers 112). The combined-signal core 136 may comprise the signal cores of the combined signal fiber 124 (e.g., that are formed from the signal cores of the plurality of signal fibers 112). In some implementations, the signal cores of the combined signal fiber 124 may be combined into a single signal core within the combined-signal core 136, and may be referred to as a single core fiber. Alternatively, as shown in FIG. 1E, the signal cores of the combined signal fiber 124 may not be combined into a single signal core within the combined-signal core 136. Accordingly, the unified fiber 128 may be referred to as a multi-core fiber that includes a plurality of signal cores. In some implementations, the combined-signal core 136 may be configured to allow signal beam coupling between the signal cores of the combined-signal core 136.

As further shown in FIG. 1E, at the cross-section 122, the outer combined-cladding 130 may surround (e.g., circumferentially surround) the combined-pump core 132, the inner combined-cladding 134, and the combined-signal core 136; the combined-pump core 132 may surround the inner combined-cladding 134 and the combined-signal core 136; and the inner combined-cladding 134 may surround the combined-signal core 136. Accordingly, the outer combined-cladding 130 may be configured to confine pump light (e.g., from pump beams that propagate via the pump cores of the plurality of pump fibers 114, the single pump core of the combined pump fiber 126, and the combined-pump core 132 of the unified fiber 128) to the combined-pump core 132 (e.g., inward from an inner diameter of the outer combined-cladding 130). The combined-pump core 132 may be configured to propagate the pump light (e.g., within the combined-pump core 132). The inner combined-cladding 134 may be configured to confine the pump light to the combined-pump core 132 (e.g., outward from an outer diameter of the outer combined-cladding 130). Alternatively, the inner combined-cladding 134 may be configured to allow the pump light to propagate via the inner combined-cladding 134 and/or to propagate to the combined-signal core 136 (and thereby allow the pump light to propagate via the combined-pump core 132, as well as the inner combined-cladding 134 and/or the combined-signal core 136).

Additionally, or alternatively, the inner combined-cladding 134 may be configured to confine signal light (e.g., from signal beams that propagate via the signal cores of the plurality of signal fibers 112, the plurality of signal of the combined signal fiber 124, and the combined-signal core 106 136 of the unified fiber 128) to the combined-signal core 136 (e.g., inward from an inner diameter of the inner combined-cladding 134). Accordingly, the combined-signal core 136 may be configured to propagate the signal light (e.g., within the combined-signal core 136). Additionally, the combined-signal core 136 may be configured to propagate the pump light (e.g., when the inner combined-cladding 134 is configured to allow the pump light to propagate from the combined-pump core 132 to the combined-signal core 136).

In some implementations, because of the formation process, the optical pump-signal combiner 102 may be tapered from the cross-section 120 to the cross-section 122 (and/or at least one of the cross-section 116 or cross-section 118 to the cross-section 120). Accordingly, a cross-sectional size of the optical pump-signal combiner 102 at the cross-section 120 (and/or at least one of the cross-section 116 or cross-section 118) may be greater than a cross-sectional size of the optical pump-signal combiner 102 at the cross-section 122. Accordingly, respective sizes (e.g., widths, diameters, thicknesses, or other measurements of size) of the first capillary 108, the second capillary 110, the combined signal fiber 124, and/or the combined pump fiber 126 at the cross-section 120 (and/or similar components at at least one of the cross-section 116 or cross-section 118) may be greater than respective sizes of the outer combined-cladding 130, the combined-pump core 132, the inner combined-cladding 134, and/or the combined-signal core 136 of the unified fiber 128 at the cross-section 120. That is, one or more of the first capillary 108, the second capillary 110, the combined signal fiber 124, and/or the unified fiber 128 may be tapered.

Referring back to FIG. 1A, the unified fiber 128 may be configured to connect to an output fiber 138 (e.g., at a splice point 140 associated with the second end 106 of the optical pump-signal combiner 102). The output fiber 138 may comprise an output-signal core, an output-pump core, and/or an output cladding (not shown in FIG. 1A). In some implementations, the output cladding may surround the output-pump core and the output-signal core, and the output-pump core may surround the output-signal core. Accordingly, an outer diameter of the combined-pump core 132 of the unified fiber 128 may, or may be configured to, match (e.g., be equal to, within a tolerance, which may be 1%, 2%, or % of the outer diameter of the combined-pump core 132) an outer diameter of the output-pump core of the output fiber 138, and/or an outer diameter of the combined-signal core 136 of the unified fiber may, or may be configured to, match (e.g., be equal to, within a tolerance, which may be 1%, 2%, or % of the outer diameter of the combined-signal core 136) an outer diameter of the output-signal core of the output fiber. In this way, the unified fiber 128 may be said to be matched to the output fiber 138.

Alternatively, the output fiber 138 may comprise an output core (e.g., an output signal and pump core), and/or an output cladding (not shown in FIG. 1A). In some implementations, the output cladding may surround the output core. Accordingly, an outer diameter of the combined-pump core 132 of the unified fiber 128 may, or may be configured to, match (e.g., be equal to, within a tolerance, which may be 1%, 2%, or % of the outer diameter of the combined-pump core 132) an outer diameter of the output core of the output fiber 138. And, an outer diameter of the unified fiber 128 may, or may be configured to, match (e.g., be equal to, within a tolerance, which may be 1%, 2%, or % of the outer diameter of the unified fiber 128) an outer diameter of the output fiber 138. In this way, the unified fiber 128 may be said to be matched to the output fiber 138. Accordingly, the output core of the output fiber 138 may be connected to the combined-pump core 132, the inner combined cladding 134, and the combined-signal core 136; and the output cladding of the output fiber 138 may be connected to the outer combined-cladding 130.

FIGS. 1A-1E are provided as an example. Other examples may differ from what is described with regard to FIGS. 1A-1E.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," "inner," "outer," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical pump-signal combiner, comprising:
a first end; and
a second end, wherein:
  the optical pump-signal combiner is tapered down from the first end to the second end;
  at a first cross-section of the optical pump-signal combiner associated with the first end, the optical pump-signal combiner includes:
    a capillary;
    a plurality of signal fibers that are disposed within the capillary,
      wherein each signal fiber, of the plurality of signal fibers, includes
      a signal core and a signal cladding; and
    a plurality of pump fibers that surround the capillary; and
      wherein each pump fiber, of the plurality of pump fibers, includes a pump core and a pump cladding; and
  at a second cross-section of the optical pump-signal combiner associated with the second end, the optical pump-signal combiner includes a unified fiber that includes an outer combined-cladding, a combined-pump core, an inner combined-cladding, and a combined-signal core.

2. The optical pump-signal combiner of claim 1, wherein: for each signal fiber of the plurality of signal fibers:
  the signal core is configured to propagate a signal beam, and
  the signal cladding is configured confine the signal beam within the signal core;
for each pump fiber of the plurality of pump fibers:
  the pump core is configured to propagate a pump beam, and
  the pump cladding is configured confine the pump beam within the pump core; and
the capillary is configured to:
  confine pump light, from pump beams that propagate via the plurality of pump fibers, outward from an outer diameter of the capillary, and
  confine signal light, from signal beams that propagate via the plurality of signal fibers, inward from an inner diameter of the capillary.

3. The optical pump-signal combiner of claim 1, wherein: the outer combined-cladding surrounds the combined-pump core, the inner combined-cladding, and the combined-signal core;
the combined-pump core surrounds the inner combined-cladding and the combined-signal core; and
the inner combined-cladding surrounds the combined-signal core.

4. The optical pump-signal combiner of claim 1, wherein: the outer combined-cladding is formed from portions of pump claddings of the plurality of pump fibers;
the combined-pump core is formed from pump cores of the plurality of pump fibers;
the inner combined-cladding is formed from at least one of other portions of the pump claddings of the plurality of pump fibers, the capillary, or portions of signal claddings of the plurality of signal fibers; and
the combined-signal core is formed from signal cores of the plurality of signal fibers.

5. The optical pump-signal combiner of claim 1, wherein:
the outer combined-cladding is configured to confine pump light, from pump beams that propagate via the plurality of pump fibers, to the combined-pump core;
the combined-pump core is configured to propagate the pump light;
the inner combined-cladding is configured to confine the pump light to the combined-pump core and to confine signal light, from signal beams that propagate via the plurality of signal fibers, to the combined-signal core; and
the combined-signal core is configured to propagate the signal light.

6. The optical pump-signal combiner of claim 1, wherein, at a third cross-section of the optical pump-signal combiner, the optical pump-signal combiner includes:
a combined signal fiber disposed within the capillary,
  wherein the combined signal fiber is formed from the plurality of signal fibers; and
a combined pump fiber that surrounds the capillary,
  wherein the combined pump fiber is formed from the plurality of pump fibers.

7. The optical pump-signal combiner of claim 6, wherein the combined signal fiber includes a plurality of signal cores and is configured to allow signal beam coupling between the plurality of signal cores, and
wherein the capillary is configured to:
  confine pump light, from pump beams that propagate via the combined pump fiber, outward from an outer diameter of the capillary; and
  confine signal light, from signal beams that propagate via the combined signal fiber, inward from an inner diameter of the capillary.

8. The optical pump-signal combiner of claim 1, wherein, at the first cross-section of the optical pump-signal combiner, the optical pump-signal combiner includes another capillary, and wherein:
the plurality of pump fibers are disposed within the other capillary; and
the outer combined-cladding is formed from portions of pump claddings of the plurality of pump fibers and the other capillary.

9. The optical pump-signal combiner of claim 1, wherein, at a splice point associated with the second end, the unified fiber is configured to connect to an output fiber, and wherein:
the output fiber comprises an output-signal core, an output-pump core, and an output cladding,
  wherein the output cladding surrounds the output-pump core and the output-signal core, and the output-pump core surrounds the output-signal core;
an outer diameter of the combined-pump core of the unified fiber matches an outer diameter of the output-pump core of the output fiber; and
an outer diameter of the combined-signal core of the unified fiber matches an outer diameter of the output-signal core of the output fiber.

10. An optical pump-signal combiner, comprising:
a first end; and
a second end, wherein:
  at a first cross-section of the optical pump-signal combiner associated with the first end, the optical pump-signal combiner includes:
    a capillary, a plurality of signal fibers that are disposed within the capillary, and a plurality of pump fibers that surround the capillary; and at a second cross-section of the optical pump-signal combiner associated with the second end, the optical pump-signal combiner includes a unified fiber that includes an outer combined-cladding, a combined-pump core, an inner combined-cladding, and a combined-signal core.

11. The optical pump-signal combiner of claim 10, wherein the optical pump-signal combiner is tapered down from the first end to the second end, and wherein:

the optical pump-signal combiner is tapered down from the first cross-section of the optical pump-signal combiner to a third cross-section of the optical pump-signal combiner according to a first taper ratio; and at least one of the capillary, the plurality of signal fibers, or the plurality of pump fibers are tapered down from the first cross-section of the optical pump-signal combiner to the third cross-section of the optical pump-signal combiner according to a second taper ratio that matches the first taper ratio.

12. The optical pump-signal combiner of claim 10, wherein the capillary is configured to:

confine pump light, from pump beams that propagate via the plurality of pump fibers, outward from an outer diameter of the capillary, confine signal light, from signal beams that propagate via the plurality of signal fibers, inward from an inner diameter of the capillary.

13. The optical pump-signal combiner of claim 10, wherein:

the outer combined-cladding is configured to confine pump light, from pump beams that propagate via the plurality of pump fibers, to the combined-pump core;

the combined-pump core is configured to propagate the pump light;

the inner combined-cladding is configured to confine the pump light to the combined-pump core and to confine signal light, from signal beams that propagate via the plurality of signal fibers, to the combined-signal core; and the combined-signal core is configured to propagate the signal light.

14. The optical pump-signal combiner of claim 10, wherein:

the outer combined-cladding is formed from portions of pump claddings of the plurality of pump fibers;

the combined-pump core is formed from pump cores of the plurality of pump fibers;

the inner combined-cladding is formed from at least one of other portions of the pump claddings of the plurality of pump fibers, the capillary, or portions of signal claddings of the plurality of signal fibers; and the combined-signal core is formed from signal cores of the plurality of signal fibers.

15. The optical pump-signal combiner of claim 10, wherein the combined-signal core includes a plurality of signal cores and is configured to allow signal beam coupling between the plurality of signal cores.

16. The optical pump-signal combiner of claim 10, wherein, at the first cross-section of the optical pump-signal combiner, the optical pump-signal combiner includes another capillary, and wherein the plurality of pump fibers are disposed within the other capillary.

17. An optical combiner, comprising:

a capillary;

a plurality of inner fibers;

a plurality of outer fibers; and a unified fiber, wherein:

at a first cross-section of the optical combiner associated with a first end of the optical combiner:

the plurality of inner fibers are disposed within the capillary, and the plurality of outer fibers surround the capillary; and at a second cross-section of the optical combiner associated with a second end of the optical combiner, the unified fiber includes:

a combined-inner core, an inner combined-cladding that surrounds the combined-inner core, a combined-outer core that surrounds the inner combined-cladding, and an outer combined-cladding that surrounds the combined-outer core.

18. The optical combiner of claim 17, wherein:

the outer combined-cladding is formed from portions of claddings of the plurality of outer fibers;

the combined-outer core is formed from cores of the plurality of outer fibers;

the inner combined-cladding is formed from at least one of other portions of the claddings of the plurality of outer fibers, the capillary, or portions of claddings of the plurality of inner fibers; and the combined-inner core is formed from cores of the plurality of inner fibers.

19. The optical combiner of claim 17, wherein the optical combiner further includes another capillary, and wherein:

the plurality of outer fibers are disposed within the other capillary at the first cross-section of the optical combiner.

20. The optical combiner of claim 17, further comprising an output fiber, wherein:

a core of the output fiber is connected to the combined-inner core, and a cladding of the output fiber is connected to the combined-outer core.

* * * * *